United States Patent
Lengsfeld

(10) Patent No.: US 9,669,937 B2
(45) Date of Patent: Jun. 6, 2017

(54) FIBER COMPOSITE PART FOR AN AIRCRAFT OR SPACECRAFT

(75) Inventor: Hauke Lengsfeld, Helmste (DE)

(73) Assignee: AIRBUS Operations GmbH, Hamburg (DE)

(*) Notice: Subject to any disclaimer, the term of this patent is extended or adjusted under 35 U.S.C. 154(b) by 935 days.

(21) Appl. No.: 12/865,363

(22) PCT Filed: Jan. 20, 2009

(86) PCT No.: PCT/EP2009/050600
§ 371 (c)(1),
(2), (4) Date: Jan. 28, 2011

(87) PCT Pub. No.: WO2009/095335
PCT Pub. Date: Aug. 6, 2009

(65) Prior Publication Data
US 2011/0114895 A1    May 19, 2011

(30) Foreign Application Priority Data
Jan. 29, 2008 (DE) .......... 10 2008 006 523

(51) Int. Cl.
| F01D 5/02 | (2006.01) |
| H01B 1/02 | (2006.01) |
| B64D 15/12 | (2006.01) |
| B29C 70/88 | (2006.01) |
| B64C 3/26 | (2006.01) |
| B64D 43/00 | (2006.01) |

(52) U.S. Cl.
CPC ........... *B64D 15/12* (2013.01); *B29C 70/882* (2013.01); *B29C 70/885* (2013.01); *B64C 3/26* (2013.01); *B64D 43/00* (2013.01); *Y02T 50/433* (2013.01)

(58) Field of Classification Search
CPC . H01B 1/02–1/04; H01B 3/004; H01B 5/105; B64D 15/12; B64D 45/02; F04D 29/364; F04D 29/388
USPC ............................ 252/500–518.1; 416/229 R
See application file for complete search history.

(56) References Cited

U.S. PATENT DOCUMENTS

| 2,992,317 A * | 7/1961 | Hoffman ................ 219/202 |
| 3,420,476 A * | 1/1969 | Schultz ................. B64D 15/12 244/134 D |
| 4,737,618 A | 4/1988 | Barbier et al. |

(Continued)

FOREIGN PATENT DOCUMENTS

| CN | 1409941 A | 4/2003 |
| DE | 102004042423 A1 | 3/2006 |

(Continued)

OTHER PUBLICATIONS

Wang 2004 ("Self-sensing attained in carbon-fiber-polymer-matrix structural composites by using the interlaminar interface as a sensor." Smart Mat and Struct, 13, pp. 570-592, online May 4, 2004).*

(Continued)

*Primary Examiner* — Tri V Nguyen
(74) *Attorney, Agent, or Firm* — Fenwick & West LLP

(57) ABSTRACT

In a fiber composite component for an aircraft or spacecraft which has electrically conductive fibers at least in portions, the fibers are coupled with an electrical energy source for charging with current to heat up the fibers and/or for measuring the electrical resistance of the fibers.

11 Claims, 2 Drawing Sheets

(56) References Cited

U.S. PATENT DOCUMENTS

| | | | |
|---|---|---|---|
| 5,132,168 A | 7/1992 | Meyn et al. | |
| 5,871,839 A * | 2/1999 | Boyd et al. | 428/328 |
| 5,925,275 A | 7/1999 | Lawson et al. | |
| 5,932,496 A * | 8/1999 | Morris et al. | 442/238 |
| 5,971,323 A * | 10/1999 | Rauch et al. | 244/134 D |
| 6,031,214 A * | 2/2000 | Bost | B64D 15/12 219/202 |
| 2003/0089892 A1* | 5/2003 | Fox et al. | 252/500 |
| 2003/0155467 A1* | 8/2003 | Petrenko | A63C 1/30 244/134 R |
| 2004/0095984 A1* | 5/2004 | Severson | G08B 19/02 374/16 |
| 2008/0111028 A1* | 5/2008 | Kumar et al. | 244/134 D |
| 2008/0156937 A1* | 7/2008 | Hindel et al. | 244/134 D |
| 2008/0166563 A1* | 7/2008 | Brittingham et al. | 428/411.1 |
| 2009/0097805 A1* | 4/2009 | Bayindir et al. | 385/101 |
| 2011/0272082 A1* | 11/2011 | Dunleavy et al. | 156/94 |

FOREIGN PATENT DOCUMENTS

| | | |
|---|---|---|
| DE | 102007026246 A1 | 12/2008 |
| EP | 0188160 A | 7/1986 |
| EP | 0248122 B1 | 12/1987 |
| EP | 0842848 A2 | 5/1998 |
| FR | 2213871 A1 | 8/1974 |
| JP | 2001 278195 A | 10/2001 |
| WO | WO 91/11891 A1 | 8/1991 |

OTHER PUBLICATIONS

Wang 1999 ("Sensing damage in in carbon fiber and its polymer-matrix and carbon-matrix composites by electrical resistance measurement." J of Mat Sc, 34, pp. 2703-2713, 1999).*

De Baere, I., "The Use of Rivets for Electrical Resistance Measurement on Carbon Fibre-Reinforced Thermoplastics," Smart Materials and Structures, Sep. 5, 2007, pp. 1821-1828, vol. 16.

PCT International Search Report, PCT/EP2009/050600, Jul. 29, 2009, 14 pages.

Chinese First Office Action, Chinese Application No. 2009801033067, Sep. 7, 2012, 9 pages.

German Office Action, German Application No. 102008006523.4, Jun. 12, 2013, 6 pages (with English summary).

* cited by examiner

FIBER COMPOSITE PART FOR AN AIRCRAFT OR SPACECRAFT

The present invention relates to a fibre composite component for an aircraft or spacecraft.

Although the present invention and the problem on which it is based can be applied to any fibre composite components, in the following they will be described in detail with reference to carbon fibre plastics materials (CFRP) components (also termed fibre composite components), for example the fuselage, wings or rudder unit of an aircraft.

Fibre composite components are widely used in aircraft construction. They are produced, for example by vacuum infusion processes for introducing a matrix, for example an epoxy resin, into fibre semi-finished products and by subsequent curing. Compared to other known processes for the production of fibre composite components, for example the prepreg process, infusion processes can be cost-efficient since they allow the use of cheaper fibre semi-finished products.

Specific areas, for example profiled lugs and front edges of the wings and/or surfaces of the wings can ice up under certain environmental conditions and can significantly alter the aerodynamic lift and weight of the aircraft. Measures for counteracting the formation of ice include, for example, inter alia, systems which have a profiled lug with inflatable regions for blowing off ice formations. Other devices use electric heating elements which are supplied either directly or indirectly (inductively) with electrical energy. A further solution is to blow out hot air through a large number of openings in the component onto the surface. Common to all these solutions is that, on the one hand, they add additional weight to the aircraft in the form of supply lines and devices and/or on the other hand entail further costs during production.

Against this background, the object of the present invention is to provide a fibre composite component to eliminate or significantly reduce the above-mentioned disadvantages.

This object is achieved according to the invention by a fibre composite component which has the features of claim 1.

According thereto, a fibre composite component for an aircraft or spacecraft is provided which has electrically conductive fibres which are arranged at least in portions. The electrically conductive fibres can be coupled with an electrical energy source for charging with current in order to heat up the fibres and/or to measure the electrical resistance of the fibres.

Advantageous embodiments and improvements of the present invention are provided in the subclaims.

A fundamental idea of the invention is to use carbon fibres, natural fibres, boron fibres and/or glass fibres which are coated with a metallic layer as conductive material in prepreg or infusion components. The fibres have a good electrical conductivity due to the metal coating. The material can be processed in tape laying processes (ATL, AFP) which are also used with other material for the fibre composite component.

Thus, compared to the approaches mentioned at the outset, the present invention has the advantage, inter alia, that the extremely thin metallic coating provides advantages in terms of weight.

The electrical energy source can be configured to provide a previously determinable electric power for heating up the at least portion-wise electrically conductive fibres. For example, the electrical energy can be taken from the on-board energy supply of the aircraft or spacecraft. An indirect coupling of the electrical energy source with the at least portion-wise electrically conductive fibres is also possible by means of an inductive coupling which has, for example, induction loop lines which are jointly installed on or in the fibre composite component.

The electrical energy source can be configured to provide a previously determinable measuring current and/or a previously determinable measuring voltage and can be coupled with a measuring device for measuring changes in length, caused by external force effects, of the at least portion-wise electrically conductive fibres. Thus, it is possible, depending on the connection and arrangement of the conductive fibres in the fibre composite component, to measure the resistance of the metal coating of the conductive fibres as a function of an applied force during operation of the aircraft or spacecraft in all operating states and to assess therefrom, for example the loading of the component or of specific portions of the component, to indicate the result to the aircraft pilot and/or to automatically initiate appropriate measures for controlling the respective loading situation.

An alternative embodiment provides that the at least portion-wise electrically conductive fibres are configured for coupling to a lightning protection system of an aircraft and spacecraft.

According to present prior art, for lightning protection in aircraft or spacecraft with composite components of this type, a copper or bronze mesh or foil pre-impregnated with resin is introduced into the composite component as the first layer. EP 0 248 122 B1 provides examples thereof. In prepreg components, the thickness of the material (compared to carbon fibre prepreg) has a negative impact particularly where there are overlaps. In this case, folds or undulations are often formed which entail reworking procedures. In addition, there is the relatively high weight of the mesh. Handling the mesh material requires particular care, because kinking or curling of relatively large blanks can also result in significant undulations in the component. Hitherto, it has only been possible to process the material manually. The present invention is able to overcome these disadvantages.

Furthermore, a combination of woven fabric or UD prepreg with metallised fibres on the surface of the composite component is conceivable. Thus, via the resistance of the metallic layers of the fibres in different directions, it is possible to determine structural strength over the longitudinal fibre material, good conductivity for heating up, good distribution of the lightning stroke energy when connected to a lightning protection system and, by a differing orientation of the electrically conductive fibres with respect to longitudinal and transverse axes of the fibre composite component, a loading thereon.

Likewise, a combination with glass fabrics is possible. The metal-coated material can be supplied in various weights per unit area exactly like present-day prepreg or dry materials.

In the following, the invention will be described in detail on the basis of embodiments with reference to the accompanying figures of the drawings.

In the figures, the same reference numerals denote the same or functionally identical components, unless indicated otherwise.

FIG. 1 is a perspective view of an embodiment of a fibre composite component 1 according to the invention as an aerofoil portion of an aircraft or spacecraft (not shown).

Figure 1:
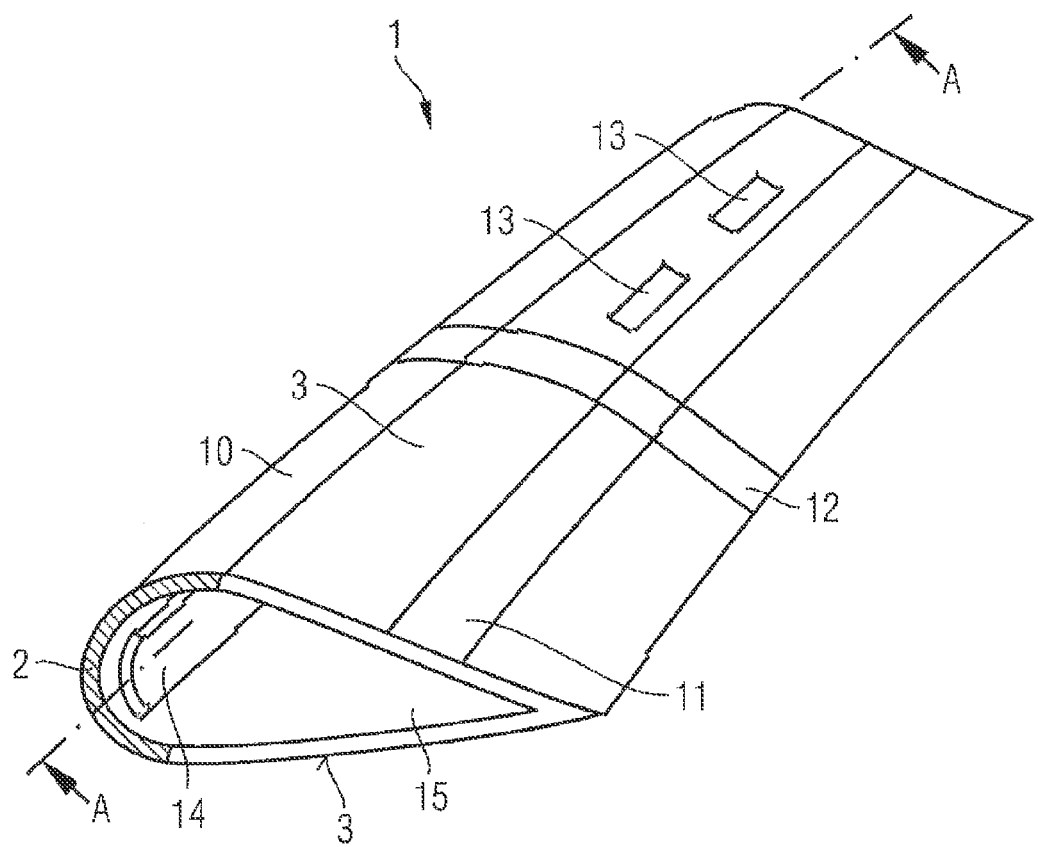
FIG. 1 is a perspective view of an embodiment of a fibre composite component according to the invention as an aerofoil portion of an aircraft or spacecraft.

The aerofoil portion has a specific profile in the illustrated cross section 15 with a front edge 1 and a surface 3 circulating the cross section 15. During operation of the aircraft or spacecraft, air flows all around the aerofoil portion, it being possible for the front edge 2 and specific regions of the surface 3 of the aerofoil portion to ice up under certain environmental conditions. In these regions, for example in an oncoming-flow region 10 of the front edge 2 (hatched in cross section), one or more longitudinal or transverse regions, 11, 12 or in region fields 13, the fibre composite component 1 has electrically conductive fibres 6 in the associated surface 3 (see FIG. 2) which are connected to an electrical energy source, for example to the electrical system of the aircraft or spacecraft, to generate heat.

This connection can be switchable as a function of the environmental conditions, in which case, for example a plurality of parameters (air flow speed, pressure and temperature) is used as influencing variables.

This connection can be made directly via connection lines (not shown) or indirectly via an induction element 14 which is arranged inside the fibre composite component 1 corresponding to the respective regions to be heated.

The electrically conductive fibres 6 (see FIG. 2) in the respective regions can also be connected or are connectable to an electrical energy source which is configured to supply a measuring current, using which it is possible to measure a resistance of electrically conductive fibres 6. For this purpose, the electrically conductive fibres 6 can be arranged in the longitudinal regions 11 in the longitudinal direction or in the transverse regions 12 in the transverse direction of the fibre composite component 1, in order to determine loads which are produced by applied forces and correspond to these directions. By changing the length of the electrically conductive fibres 6, these forces alter the resistance of said electrically conductive fibres 6, which can be used in a suitable connected measuring device where the resistance values are processed to indicate the loading of specific regions.

For this purpose, it is also possible to use individual partial regions, which are indicated here merely schematically as region fields 13.

Figure 2:
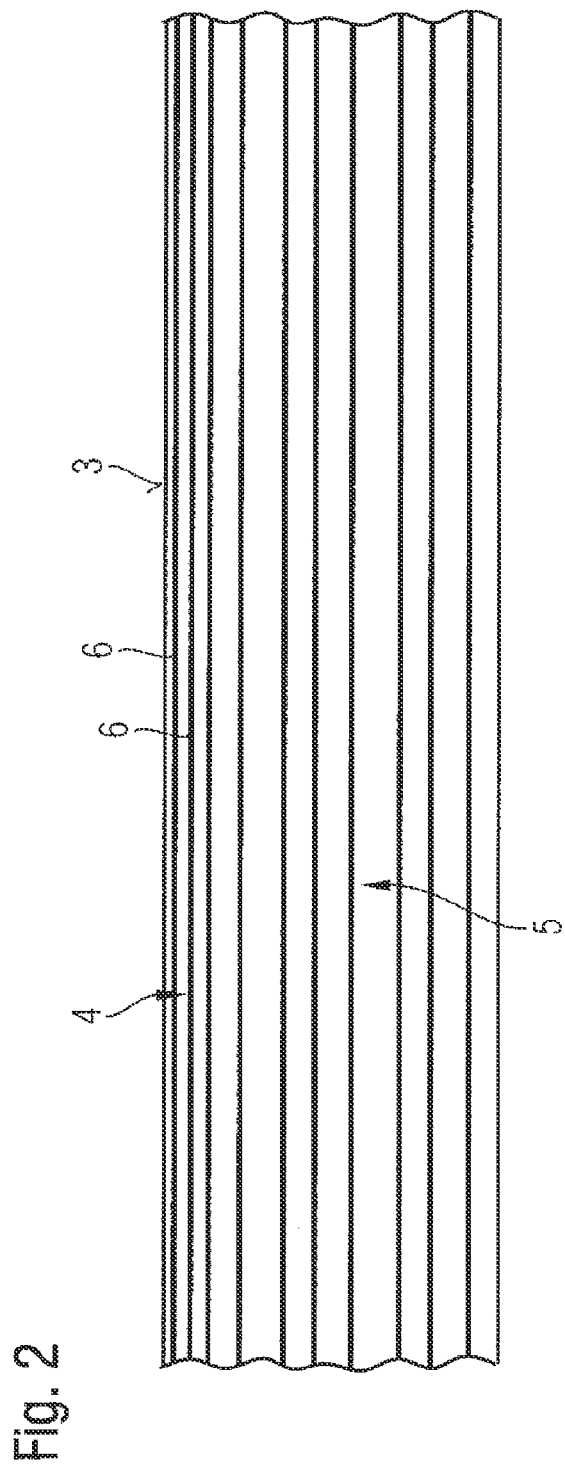
FIG. 2 is an enlarged schematised sectional view along line A-A of FIG. 1.

FIG. 2 is an enlarged schematised sectional view along line A-A of FIG. 1 of the fibre composite component 1.

The fibre composite component 1 consists of a plurality of layers which are shown here schematically as lower standard layers 5 and upper layers 4 on the surface 3. The electrically conductive fibres 6 run in the upper layers in the longitudinal direction of the fibre composite component 1, as shown in FIG. 1. Of course, other directions are also possible.

Figure 3:
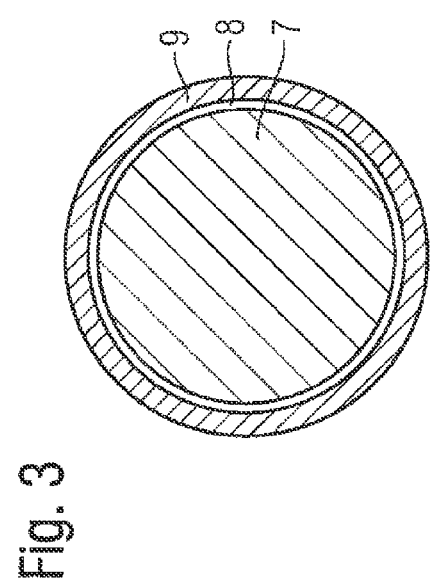
FIG. 3 is an enlarged cross-sectional view of an embodiment of an electrically conductive fibre with a metallic layer.

An example of an electrically conductive fibre 6 of this type is shown in an enlarged cross section in FIG. 3. A fibre 7, made for example of carbon or glass, is coated with a layer of adhesion promoter 8 which ensures that a metallic layer 9 adheres to the entire periphery of the fibre 7. This metallic layer can be applied in different processes which will not be described here. The material is preferably a metal or a metallic alloy with good electrical conduction characteristics.

Although the present invention has presently been described on the basis of preferred embodiments, it is not restricted thereto, but can be modified in many different ways.

For example, instead of the induction element, it is also possible to use a microwave generator.

The electrically conductive fibres 6 can be arranged both unidirectionally (UD tape) and in fabric formation. For a fabric, resistance measurements are also possible in other directions relative to the longitudinal and transverse axes of the fibre composite component 1.

A good conductivity of the entire corresponding region, particularly in the case of a connection to a lightning protection system, can be achieved in that the fibres 6 contact one another being adjacent and superimposed, which is also possible, for example in the case of a fabric tape.

The electrically conductive fibres 6 can also be arranged additionally or only inside the standard layers 5 or on the inner surface of the fibre composite component 1.

The electrically conductive fibres 6 have particular advantages in terms of weight and space in the case of slats and flaps.

In the case of a fibre composite component 1 for an aircraft or spacecraft which has electrically conductive fibres 6 at least in portions, the fibres 6 are coupled with an electrical energy source for charging with current to heat up the fibres 6 and/or for measuring the electrical resistance of the fibres 6.

LIST OF REFERENCE NUMERALS 1 fibre composite component
2 front edge
3 surface
4 upper layers
5 standard layers
6 electrically conductive fibres
7 fibre
8 adhesion promoter
9 metallic layer
10 oncoming flow region
11 longitudinal region
12 transverse region
13 region field
14 induction element
15 cross section

The invention claimed is:

1. An aircraft or spacecraft comprising:
a fibre composite component consisting of a plurality of layers, the fibre composite component being an aerofoil which has an oncoming flow region and longitudinal and transverse regions, wherein electrically conductive fibres are integrally formed with the fibre composite component, said electrically conductive fibres each including a respective metallic coating layer and arranged at least in portions of the oncoming flow region and of the longitudinal and transverse regions, wherein lengths of the electrically conductive fibres in the longitudinal and transverse regions change under external force effects, said electrically conductive fibres running in upper layers or lower standard layers of the fibre composite component;
an electrical energy source coupled to the electrically conductive fibres in the oncoming flow region and in the longitudinal and transverse regions and adapted to provide current to heat the electrically conductive fibres, wherein the electrical energy source is configured to provide at least one of a previously determined measuring current or a previously determined measuring voltage to at least the electrically conductive fibres in the longitudinal and transverse regions, and wherein a connection between the electrical energy source and the electrically conductive fibres is switchable as a function of an air flow speed, a pressure and a temperature; and a measuring device configured to measure changes in the lengths of the electrically conductive fibres in the longitudinal and transverse regions by measuring changes in resistance of the electrically conductive fibres in the longitudinal and transverse regions based on at least one of the previously determined measuring current or the previously determined measuring voltage.

2. The aircraft or spacecraft according to claim 1, wherein the electrically conductive fibres comprise at least one of carbon fibres, natural fibres, boron fibres or glass fibres.

3. The aircraft or spacecraft according to claim 1, wherein the electrical energy source is configured to provide a previously determined electrical power to heat the electrically conductive fibres.

4. The aircraft or spacecraft according to claim 1, wherein the measuring device is configured for measuring resistance of the respective metallic coating layers of the electrically conductive fibres.

5. The aircraft or spacecraft according to claim 1, further comprising a lighting protection system coupled to the electrically conductive fibres.

6. The aircraft or spacecraft according to claim 1, wherein the fibre composite component is produced from prepreg components.

7. The aircraft or spacecraft according to claim 1, wherein the fibre composite component is produced from infusion components.

8. The aircraft or spacecraft according to claim 1, wherein at least a portion of the electrically conductive fibres is arranged as a unidirectional tape.

9. The aircraft or spacecraft according to claim 1, wherein at least a portion of the electrically conductive fibres is arranged as a fabric tape.

10. The aircraft or spacecraft according to claim 1, wherein the electrically conductive fibres are in the upper layers of the fibre composite component.

11. The aircraft or spacecraft according to claim 1, wherein the electrically conductive fibres are in the lower standard layers of the fibre composite component.

* * * * *